United States Patent
Pantzar et al.

(10) Patent No.: US 6,942,431 B2
(45) Date of Patent: Sep. 13, 2005

(54) ROTATABLE CUTTING TOOL WITH A FINE-ADJUSTMENT MECHANISM FOR A CUTTING INSERT

(75) Inventors: Göran Pantzar, Årsunda (SE); Lars Hellström, Årsunda (SE)

(73) Assignee: Sandvik Antiebolag, Sandviken (SE)

( * ) Notice: Subject to any disclaimer, the term of this patent is extended or adjusted under 35 U.S.C. 154(b) by 59 days.

(21) Appl. No.: 10/299,833

(22) Filed: Nov. 20, 2002

(65) Prior Publication Data

US 2003/0113173 A1 Jun. 19, 2003

(30) Foreign Application Priority Data

Nov. 21, 2001 (SE) .............................................. 0103863

(51) Int. Cl.[7] .............................................. B26D 1/12
(52) U.S. Cl. ............................ 407/40; 407/41; 407/44; 407/36
(58) Field of Search ............................ 407/40, 41, 36, 407/44, 35

(56) References Cited

U.S. PATENT DOCUMENTS

| | | | |
|---|---|---|---|
| 3,205,559 A | | 9/1965 | Greenleaf |
| 3,708,843 A | * | 1/1973 | Erkfritz ........................ 407/38 |
| 3,792,517 A | | 2/1974 | Gage |
| 3,997,951 A | * | 12/1976 | Williscraft .................. 407/105 |
| 4,382,458 A | * | 5/1983 | Schadlich et al. ........... 144/230 |
| 5,156,501 A | * | 10/1992 | Pawlik et al. ................. 407/36 |
| 5,209,610 A | * | 5/1993 | Arai et al. ..................... 407/36 |
| 5,217,330 A | | 6/1993 | Dennstedt |
| 5,542,793 A | * | 8/1996 | Deiss et al. ................... 407/35 |
| 6,056,484 A | * | 5/2000 | Mitchell et al. .............. 407/36 |
| 6,619,892 B2 | * | 9/2003 | Enquist ......................... 407/36 |
| 2002/0053266 A1 | | 5/2002 | Enquist |
| 2002/0081168 A1 | | 6/2002 | Kress |

FOREIGN PATENT DOCUMENTS

| | | |
|---|---|---|
| DE | 80 25 087 U1 | 2/1981 |
| DE | 196 48 039 | 2/1998 |
| FR | 2 651 703 | 3/1991 |
| GB | 933 613 | 8/1963 |

* cited by examiner

Primary Examiner—Willmon Fridie, Jr.
(74) Attorney, Agent, or Firm—Burns, Doane, Swecker & Mathis, LLP

(57) ABSTRACT

A rotatable cutting tool, e.g., a milling cutter, includes a rotatable base body and a cutting insert, which in addition to two opposite side surfaces has front and rear end surfaces. For axial fine-adjustment of the cutting insert, a set screw is arranged that is located in an area behind the cutting insert and inclined at an obtuse angle to a side surface of the cutting insert. During an unscrewing of the set screw, it presses against the rear end surface of the cutting insert with the purpose of moving the cutting insert in the direction axially forwards, whereby the screw, due to the obtuse angle, is centrifugally secured by means of the actual cutting insert.

12 Claims, 1 Drawing Sheet

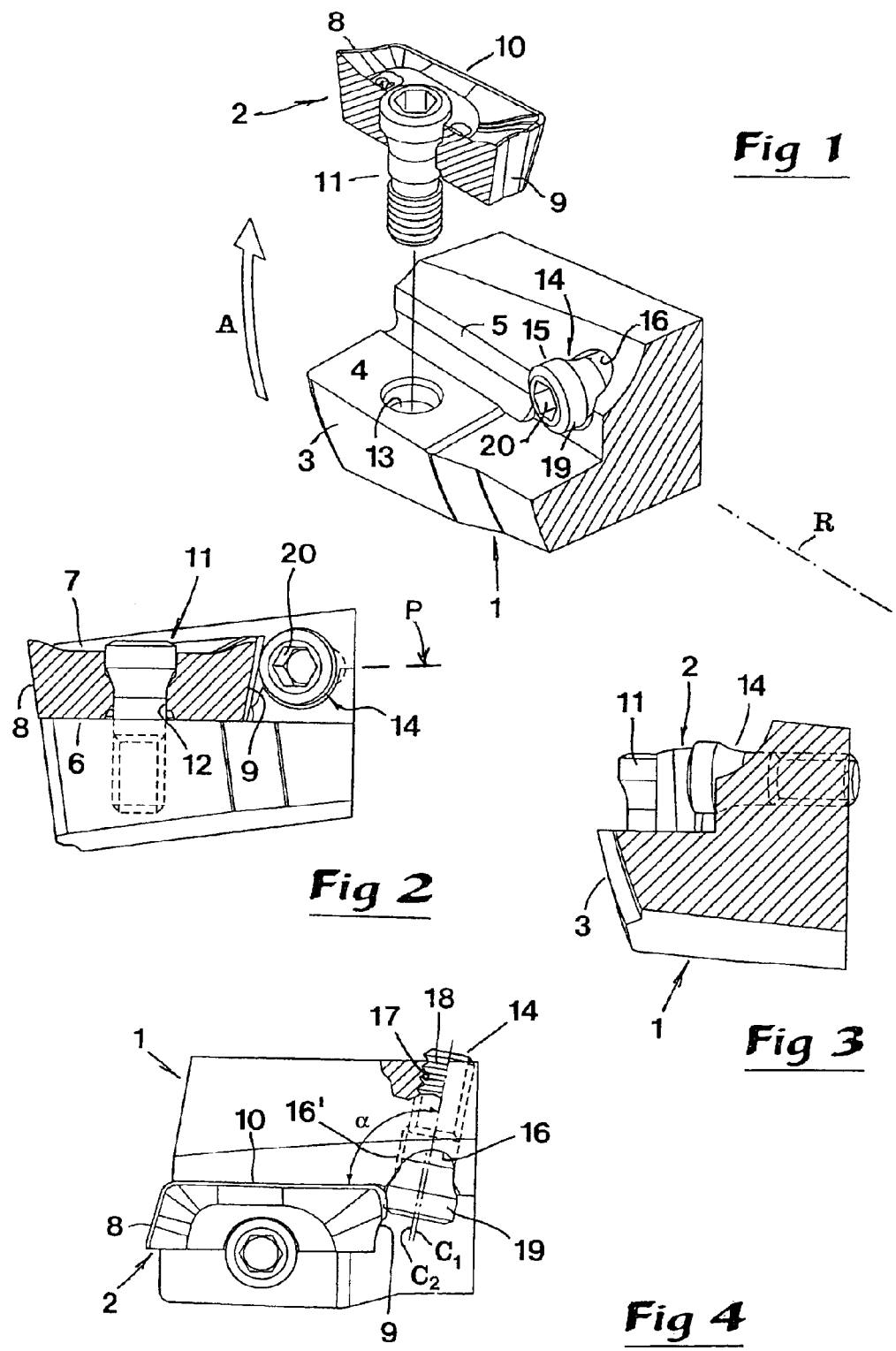

ROTATABLE CUTTING TOOL WITH A FINE-ADJUSTMENT MECHANISM FOR A CUTTING INSERT

This application claims priority under 35 U.S.C. §119 and/or 365 to Patent Application Ser. No. 0103863-7 filed in Sweden on Nov. 21, 2001, the entire content of which is hereby incorporated by reference.

BACKGROUND OF THE INVENTION

This invention relates to a rotatable cutting tool of the type that comprises a basic body rotatable around a geometric axis and a cutting insert, which in addition to two opposite side surfaces has front and rear end surfaces, and is mountable in a seat formed in the basic body having a bottom surface against which a bottom side on the cutting insert is pressable; means in order to fix the cutting insert in respect to radial and/or tangential forces; a clamping unit for clamping the cutting insert in respect to axial forces; as well as a set screw for axial fine-adjustment of the cutting insert.

The tool in question may to advantage consist of a milling tool.

PRIOR ART

Older milling tools were, without exception, formed with cutting insert seats, which in addition to a bottom surface and a fixed radial support also were delimited by a fixed axial support, i.e., a fixed surface formed in the basic body at an angle to the bottom surface as well as a radial support surface. However, a disadvantage of seats having fixed support surfaces for the radial forces as well the axial forces is that extremely tight requirements on precision are made during the manufacture of the basic body of the tool, something which among other things implies considerable manufacturing costs. For this reason, milling tools have recently been developed, which rely on only one fixed support for the cutting insert, viz. a radial support, while the axial forces on the cutting insert are taken care of by the same clamping unit, usually a locking screw, that is used for fixing the cutting insert in the seat. An example of such a milling tool is disclosed in U.S. Pat. No. 5,542,793. Another example is disclosed in the applicant's own Swedish patent application 0102682-2 filed Aug. 9, 2001. By letting the locking screw carry the axial forces on the cutting insert, the fixed axial support may be spared. In this way, precision-requiring machining operations can be omitted to a large extent.

During many types of millings, such as face milling, end milling and the like, there is a need for enabling fine-adjustment of the cutting inserts in the axial direction, above all with the purpose of distributing the cutting forces evenly on the different cutting inserts in the tool. For this purpose, set screws have previously generally been used, which however were included in more or less complicated mechanisms that on the one hand make the tools more expensive, and on the other hand give a mediocre centrifugal security.

AIMS AND FEATURES OF THE INVENTION

The present invention aims at obviating the above-mentioned drawbacks of previously known rotatable cutting tools and at providing an improved tool. Therefore, a primary object of the invention is to provide a cutting tool, the cutting insert of which may be fine-adjusted axially in a simple and fast manner by means of a set screw that is centrifugally secured in a reliable way. An additional aim is to provide a cutting tool which is structurally simple and that may be manufactured by means of simple machining operations.

According to the invention, at least the primary object is attained by a rotatable cutting tool which comprises a base body, a cutting insert, a clamp, and a set screw. The base body forms a seat having a bottom surface and a support surface extending along and adjacent to an edge of the bottom surface. The cutting insert is supported in the seat. The insert includes front and rear end surfaces interconnected by a side surface, the side surface engaging the support surface of the seat. The clamp clamps the insert in the seat. The set screw is disposed adjacent the rear end surface of the insert and is disposed in a hole formed in the base body. The set screw includes a male thread engaging a female thread of the hole, and a head arranged to push against the rear end surface of the insert as the set screw is unscrewed. The hole is arranged such that the head gradually displaces the insert as the set screw is unscrewed.

Preferably, the hole is arranged such that the set screw travels non-parallel to the rear end surface of the insert as it is unscrewed.

The hole preferably includes a non-threaded portion in which the head is disposed. The non-threaded portion of the hole defining a first axis which is radially offset from a second axis defined by the head in a direction generally toward the rear end surface of the insert, wherein the head is pre-tensioned toward the rear end surface of the insert.

The invention also relates to a method of adjusting the insert by unscrewing the set screw in a direction causing the head to engage the rear end surface of the insert and displace the insert by a distance which increases as the set screw is unscrewed, and simultaneously pre-tensioning the head toward the rear surface.

Tools of the kind in question are primarily (though not necessarily) intended for chip removing machining of work-pieces of metal.

BRIEF DESCRIPTION OF THE DRAWING

The objects and advantages of the invention will become apparent from the following detailed description of a preferred embodiment thereof in connection with the accompanying drawing in which like numerals designate like elements, and in which:

FIG. 1 is a perspective exploded view, which illustrates a partially sectioned milling or basic body, as well as a partially cut cutting insert separated the same.

FIG. 2 is a partial side view of the milling body, with the cutting insert shown in section.

FIG. 3 is a partial section regarded from behind in FIG. 1 through the milling body.

FIG. 4 is a partial planar view of the milling body together with the cutting insert.

DESCRIPTION OF A PREFERRED EMBODIMENT OF THE INVENTION

Shown in the figures are a rotatable base body or holder 1 and a replaceable cutting insert 2. The body 1, which to advantage, though not necessarily, constitutes part of a milling tool, is rotatable around a geometric axis designated R, which is schematically depicted without claiming to be correctly placed in respect of the envelope surface 3 of the body 1. The direction of rotation of the body 1 is indicated by the arrow A. For each cutting insert 2 (only one of which is shown in FIG. 1), a seat or a so-called insert seat, which is delimited by a bottom 4 as well as a radial support 5, is formed in the body 1. In the example, the bottom 4 has the shape of a planar surface for co-operation with a planar bottom side 6 on the cutting insert 2. However, the bottom may also be formed with so-called serrations, which co-operate with corresponding serrations on the bottom side of the cutting insert. Furthermore, the radial support 5 is illustrated in the form of a single continuous, planar surface. However, in practice, the radial support may to advantage consist of two axially spaced-apart support surfaces that separately have a limited area.

The cutting insert 2 has a generally flat shape and is, in addition to the bottom side 6, defined by a top side 7 as well as four flank surfaces that extend between the top side 7 and the bottom side 6. Among said four flank surfaces, one of them forms a front-end surface 8 and another a rear end surface 9 when the cutting insert is mounted in the seat. Furthermore, between said front and rear end surfaces 8, 9, two side surfaces 10 extend, only one of which is shown in the drawing, viz. the side surface that is pressed against the radial support 5.

The cutting insert can be secured in the appurtenant seat by means of a clamping unit that in the example is in the form of a locking screw 11, which extends through a through hole 12 in the cutting insert and is tightened by a male thread in a threaded hole 13 that ports in the bottom surface 4 of the seat.

The radial and/or tangential forces that act on the cutting insert are carried by the bottom surface 4 and the radial support surface 5. The axial forces that act on the cutting insert are carried by the screw 11. In other words, the seat or the cutting seat lacks any fixed axial support surface of the type that was present in older milling tools. In order to be able to withstand the axial forces, the locking screw 11 should be specially designed, e.g., in the way disclosed in the applicant's SE-0102682-2.

A set screw 14 is arranged for the axial fine-adjustment of the cutting insert 2.

As far as the shown tool has been described hitherto, the same is in all essentials previously known.

Characteristic of the invention is that the set screw 14 has the outer part or head 15 thereof located in an area behind the cutting insert and is inclined at an obtuse angle α in relation to the side surface 10 of the cutting insert. The screw 14 is mounted in a hole 16 that includes an unthreaded port section 16' which ports in (i.e., intersects) a surface portion of the basic body positioned immediately behind the radial support 5. The hole also includes a female thread 17 with which a male thread 18 on the screw shank is in engagement. In practice, the set screw 14 and the hole therefor should, in the main, be located in the same plane as the cutting insert 2, i.e., in a plane which is parallel to the bottom surface 4 of the cutting seat. As can be seen from FIG. 2, a plane P disposed parallel to the bottom surface 4 and containing the center axis of the set screw 14, intersects the insert. The angle α may vary, but should be within the range of 91–120°, suitably 95–110°. In the example in the drawing, the angle α amounts to 100°. As can also be seen in FIG. 4, the envelope surface 19 of the set screw becomes spaced farther from the center axis of the set screw as the envelope surface approaches the shank of the set screw.

As can be seen in the drawing, the head 15 of the set screw is integral with the shank and formed with a rotationally symmetrical envelope surface 19 for pressing directly against the rear end surface 9 of the cutting insert, e.g., in the area of a corner of the cutting insert, as is shown in FIG. 4.

The envelope surface 19 may to advantage be conical although also other geometrical basic shapes are feasible, e.g., convexly curved surfaces.

A key recess 20 ports in the end surface of the head 15. In the example, said key recess consists of a socket for an Allen key. However, the key recess may have an arbitrary shape and, for instance, consist of a groove or a star shaped socket.

In practice, the set screw should be made so that the same may be pressed with a certain pre-tension against the rear end surface of the cutting insert. Such pre-tension may be provided by the center axis C1 of the female thread 17, (see FIG. 4) and the center axis C2 for the unthreaded port section 16' of the hole 16, against which the smooth, not threaded shank part of the screw abuts, being made eccentric in relation to each other (i.e., a radial offset). In this way, the screw may, during unscrewing (i.e., during adjustment of the cutting insert—explained below), be brought to abut with a certain friction against the port surface of the hole 16, shown to the right in FIG. 4, at the same time as the diametrically opposed envelope surface portion of the head is clamped resiliently against the rear end surface of the cutting insert. As a consequence of the pre-tension and the simultaneous frictional abutment, a self-locking of the set screw in each given setting is guaranteed.

Functions of the Tool According to the Invention

After the set screw 14 has been inserted, the cutting insert is placed on the seat, and the locking screw inserted. When the locking screw 11 is finally tightened, i.e., tightened with a predetermined torque, the same guarantees an axial clamping of the cutting insert, as well as a pressing of the side surface 10 of the cutting insert against the radial support 5. In this state, the axial forces that act on the cutting insert are withstood by the locking screw, while the radial and tangential forces are withstood by the radial support 5 as well as the bottom surface 4. In the axially fixed state thereof, the cutting insert assumes a position in which the cutting edge thereof normally differs very little from the exact desired, nominal position. However, at times, minor positional deviations may be present. In such cases, the cutting insert can readily be fine adjusted by the set screw 14 being unscrewed from the appurtenant female thread 17. This takes place by means of a key, which is inserted into the key recess 20. During the unscrewing, a force vector which presses the cutting insert out in the direction axially forwards will be applied to the cutting insert by the surface 19 of the set screw 14. That is, since the surface 19, as viewed in FIG. 4, is not parallel to the rear end surface 9 of the cutting insert, the surface 19 will gradually push the cutting insert to the left in FIG. 4 as the set screw is unscrewed. By choosing the angle of inclination a, the pitch of the threads 17, 18 and the geometry of the envelope surface 19 in relation to the shape of the cutting insert, in particular the shape of the rear end surface that is in contact with the set screw, in a suitable way, the setting can be effected in very fine steps, e.g., within the range of 1/1000–1/100 mm.

According to the invention, a simple means enables a very selective fine-adjustment of the cutting insert, the insert being adjusted solely during rotation of the set screw 14. Moreover, the set screw is centrifugally secured in a reliable way, more precisely without any other assistance than the contact with the cutting insert. Any tendency of the set screw to creep out of the appurtenant hole as a consequence of the action of centrifugal forces, which at high speeds of rotation may become considerable, is resisted by the fact that the set screw is frictionally engaged with the rear surface 19 of the insert, and the right-hand portion of the hole section 16' as seen in FIG. 4.

In this connection, it should be pointed out that there are, during the fine-adjustment of the cutting insert, two different alternatives concerning the tightening of the locking screw. One alternative is that the locking screw is loosened a little from the fully tightened state thereof and then re-tightened with a predetermined torque after the insert has been fine-adjusted by the set screw. The second alternative is that the fine-adjustment by means of the set screw is carried out after final tightening of the locking screw 11, whereby transitional movements of the cutting insert (which motions are very small) are absorbed by elastic deformation of the shank of the locking screw.

Feasible Modifications of the Invention

The invention is not solely limited to the embodiment described above and shown in the drawing. Thus, it is feasible to dispense with the fixed radial support formed in the basic body of the tool, and replace the same with a serration coupling between the cutting insert and the basic body, i.e., a first serration surface in the bottom of the cutting seat instead of the shown planar bottom surface 4, as well as a corresponding serration surface in the bottom side of the cutting insert. Furthermore, it should be pointed out that clamping units other than a screw 11 may be used for clamping the cutting insert. Clamps may, for instance, be used.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A rotatable cutting tool comprising:
a base body forming a seat having a bottom surface and a support surface extending along and adjacent to an edge of the bottom surface,
a cutting insert supported in the seat, the insert including front and rear end surfaces interconnected by a side surface, the side surface engaging the support surface of the seat,
a clamp for clamping the insert in the seat, and
a set screw disposed adjacent the rear end surface of the insert and threadedly disposed in a hole formed in the base body; the set screw including a shank having a male thread engaging a female thread of the hole, and a head integral with the shank and arranged to push directly against the rear end surface of the insert as the set screw is unscrewed for adjustably displacing the insert, the hole arranged such that the head rotates and gradually displaces the insert as the set screw is rotated about a center axis thereof, wherein the insert is adjusted solely during rotation of the set screw.

2. The tool according to claim 1 wherein the hole is arranged such that the set screw travels non-parallel to the rear end surface of the insert as it is rotated.

3. The tool according to claim 1 wherein a plane oriented parallel to the bottom surface of the seat and containing a center axis of the hole passes through the insert.

4. The tool according to claim 1 wherein the head includes an envelope surface configured symmetrically with respect to the center axis of the set screw and engaging the rear end surface of the insert.

5. The tool according to claim 1 wherein the hole includes a non-threaded portion in which the head is disposed, the non-threaded portion of the hole defining a first axis which is radially offset from a second axis defined by the head in a direction generally toward the rear end surface of the insert, wherein the head is pre-tensioned toward the rear end surface of the insert.

6. The tool according to claim 1 wherein the hole forms an obtuse angle relative to the side surface of the insert.

7. A method of adjusting a cutting insert on a rotatable tool, the tool comprising a base body forming a seat having a bottom surface and a support surface extending along and adjacent to an edge of the bottom surface, a cutting insert support in the seat, the insert including front and rear end surfaces interconnected by a side surface, the side surface engaging the support surface of the seat, a clamp for clamping the insert in the seat, and a set screw disposed adjacent the rear end surface of the insert and threadedly disposed in a hole formed in the base body; the set screw including a shank having a male thread engaging a female thread of the hole, and a head integral with the shank and arranged to push directly against the rear end surface of the insert as the set screw is rotated; the method comprising the step of:
rotating the set screw to cause the head to rotate and engage and displace the insert by a distance which increases as the set screw is rotated.

8. The method according to claim 7 further comprising the step of simultaneously pre-tensioning the head against the rear surface.

9. A rotatable cutting tool comprising:
a base body forming a seat having a bottom surface and a support surface extending along and adjacent to an edge of the bottom surface,
a cutting insert supported in the seat, the insert including front and rear end surfaces interconnected by a side surface, the side surface engaging the support surface of the seat,
a clamp for clamping the insert in the seat, and
a set screw disposed adjacent the rear end surface of the insert and threadedly disposed in a hole formed in the base body; the set screw including a male thread engaging a female thread of the hole, and a head arranged to push against the rear end surface of the insert as the set screw is rotated the hole arranged such that the head gradually displaces the insert as the set screw is rotated,
wherein the hole includes a non-threaded portion of the hole defining a first axis which is radially offset from a second axis defined by the head in a direction generally toward the rear end surface of the insert, wherein the head is pre-tensioned toward the rear end surface of the insert.

10. The tool according to claim 1 wherein the head extends continuously for 360° about the center axis of the set screw.

11. The tool according to claim 1 wherein an envelope surface of the set screw is inclined relative to the center axis of the set screw, wherein the envelope surface is spaced farther from the center axis as the envelope surface approaches the shank of the set screw.

12. The method according to claim 9 wherein the head gradually displaces the insert as the set screw is rotated in a direction causing the set screw to become unscrewed.

* * * * *